US006914886B2

(12) United States Patent
Peles et al.

(10) Patent No.: US 6,914,886 B2
(45) Date of Patent: Jul. 5, 2005

(54) CONTROLLING TRAFFIC ON LINKS BETWEEN AUTONOMOUS SYSTEMS

(75) Inventors: Amir Peles, Tel Aviv (IL); Smadar Fuks, Tel Aviv (IL)

(73) Assignee: Radware Ltd., Tel-Aviv (IL)

( * ) Notice: Subject to any disclaimer, the term of this patent is extended or adjusted under 35 U.S.C. 154(b) by 972 days.

(21) Appl. No.: 09/848,546

(22) Filed: May 3, 2001

(65) Prior Publication Data

US 2002/0163884 A1 Nov. 7, 2002

(51) Int. Cl.[7] .............................................. H04L 12/28
(52) U.S. Cl. ...................................... 370/254; 370/351
(58) Field of Search ................................ 370/254, 255, 370/351, 401, 465, 229, 230

(56) References Cited

U.S. PATENT DOCUMENTS 5,983,281 A * 11/1999 Ogle et al.
6,009,081 A * 12/1999 Wheeler et al.
6,038,594 A * 3/2000 Puente et al.
6,130,890 A * 10/2000 Leinwand et al.
6,167,444 A * 12/2000 Boden et al.

OTHER PUBLICATIONS

"BGP Routing Part I: BGP and Multi–Homing" http://www.netazx.com/~freedman/bgp.html*.*

* cited by examiner

Primary Examiner—Chi Pham
Assistant Examiner—Keith M. George
(74) Attorney, Agent, or Firm—Katten Muchin Zavis Rosenman

(57) ABSTRACT

The present invention provides for controlling incoming traffics on the links to an autonomous system. Incoming traffic usage for blocks of IP addresses within an autonomous system and load, congestion and capacity of the links for the incoming traffic is monitored to determine the optimal link for incoming traffic destined for a block of IP addresses. Incoming traffic for a block of IP addresses is biased towards the optimal link by configuring the border routers to announce the block of IP addresses via Border Gateway Protocol (BGP) across the non-optimal links with one or more local AS numbers pre-pended, causing the non-optimal links to look as if they are of a greater routing distance than the optimal link. In addition, outgoing traffic for a session is separately controlled by tagging the packets of the session for a specific link, causing the router to send the packet out the optimal link.

74 Claims, 4 Drawing Sheets

| Group | Link No. | Link Usage | IP Block | Incoming Traffic Usage |
|---|---|---|---|---|
| 1 | 110 | 20 mbps | 136.128.0.0 – 136.128.15.255 | 16 mbps |
| | | | 136.128.96.0 – 136.128.223.255 | 4 mbps |
| 2 | 112 | 10 mbps | 136.128.16.0 – 136.128.95.255 | 2 mbps |
| | | | 176.128.224.0 – 136.128.255.255 | 8 mbps |

Figure 3

| Link | Capacity | Congestion (Packet Loss/Retransmission) | Load | Price |
|---|---|---|---|---|
| 110 | 45 mbps | 1.5% | 20 mbps | 5 |
| 112 | 45 mbps | 0% | 10 mbps | 10 |

Figure 4

LINK PROXIMITY TABLE

| Destination Range | Link 110 | | Link 112 | |
|---|---|---|---|---|
| | Hops | Latency (ms) | Hops | Latency (ms) |
| 180.212.x.x | 3 | 120 | 2 | 140 |
| 182.168.x.x | 4 | 180 | 1 | 80 |
| 129.209.x.x | 1 | 20 | 4 | 240 |
| 148.213.x.x | 2 | 80 | 3 | 180 |

Figure 5

TOS POLICY TABLE

| TOS Value | Link |
|---|---|
| 1 | 110 |
| 2 | 112 |
| 3 | 110 |

Figure 6

SOURCE ROUTING POLICY TABLE

| Source Networks | Link |
|---|---|
| 136.128.x.x | 110 |
| 129.31.x.x | 112 |
| 175.202.x.x | 110 |

Figure 7

CONTROLLING TRAFFIC ON LINKS BETWEEN AUTONOMOUS SYSTEMS

CROSS REFERENCE TO RELATED APPLICATIONS

This application is related to U.S. application Ser. No. 09/467,763.

BACKGROUND OF THE INVENTION

1. Field of Invention

The present invention relates generally to the field of internetworking. More specifically, the present invention is related to controlling traffic distribution between the links connecting an autonomous system to other autonomous systems.

2. Discussion of Relevant Art

An internetwork is a collection of individual, typically heterogenous, networks which are connected by internetworking devices, such as routers, to function as a single network. In these internetworks, such as the Internet, routing is the act of moving information, usually in the form of packets, from a source host to a destination host across the internetwork. In order to enable the routing of the information across the internetwork, a network layer (layer 3 of the OSI reference model) protocol is utilized to provide addressing information and some control information. The most ubiquitous network layer protocol in use today is the Internet Protocol (IP), which provides protocol addresses (in human readable form) in a manner termed dotted decimal notation (e.g. 10.1.1.1).

To route information from a source with one network layer protocol address to a destination device with a different network layer address, routers perform two activities. One of the activities is determining optimal routing paths in the internetwork and maintaining routing tables of these paths, while the other is the actual transport of the packets through the internetwork.

The actual transport of the packets across the internetwork is typically termed switching. For switching, a router typically receives a packet addressed to the routers physical address (Media Access Control (MAC)-layer address). This packet contains the network layer address of the destination host. The router then utilizes its routing table to determine if it knows how to forward this packet or not. If the router does not know how to forward the packet, the packet is dropped. On the other hand, if the router does know how to forward the packet, it changes the physical address to the physical address of the next device to receive the packet in order to get the packet to the destination. At times this next device is the destination host itself. When the next device is not the destination host, the next device is usually another router. This next router then receives the packet and performs the same switching process on the packet. Therefore, as the packet is propagated through the internetwork towards its destination host, the physical address of the packet changes, while the network layer address remains the same.

In order to determine how to forward a packet, routers maintain routing tables. Routing algorithms generate the routing tables maintained by the router using information received from other logically or physically connected routers concerning the networks that are reachable through those connected routers. Typically, these routing algorithms take the information received from the other routers and fill routing tables with information such as destination/next hop information. This destination/next hop information tells a router that a destination network address can be reached by sending the packet to a particular router as the "next hop" of the packets movement through the internetwork to its destination host. By checking a destination network layer address of a received packet for an associated next hop in the routing table, a router determines how to forward the packet.

As described, to build the routing tables, a router receives information from other connected routers concerning the networks reachable by those other routers. In order to communicate this information, routers utilize routing protocols. One such protocol is the Border Gateway Protocol (BGP). BGP is defined in Request For Comment (RFC) 1771, available at any of the RFC archives on the World Wide Web, such as BGP provides loop-free interdomain routing between autonomous systems (AS). An AS is normally defined in the art as a set of routers that operate under the same administration. For the Internet, ASs normally comprise Internet Service Providers (ISP) or other large organizational entities, such as universities, government organizations and large corporate networks. Peer border routers located on the boundaries of each AS exchange information pertaining to the reachability of blocks of IP addresses for transit networks and networks that originate from that AS.

An illustration of this is provided in FIG. 1. AS 100's border router 100 connects it to AS 200 and AS 300 via their respective border routers 104 and 102. AS 200's border router 104 additionally connects it to AS 400 via AS 400's border router 108. Likewise, AS 300's border router 102 connects it to AS 500 via AS 500's border router 106. AS 400 and AS 500 are also connected to each other via their respective border routers 108 and 106. Each of the connected border routers communicates reachability information to its peer routers utilizing BGP. Utilizing BGP messages, each of these border routers sends reachability information to its peers concerning a block of IP addresses, or prefixes, which it is capable of reaching. This reachability information is propagated throughout the internetwork and as it is propagated, each router along the path pre-pends its unique AS number to the BGP message. The list of prepended AS numbers constitutes the AS path of the route and, along with the prefix, designates a transit route through the network for a destination network layer address.

For instance, border router 100 determines that it is able to reach the block of network layer addresses 136.128.x.x. Border router 100 sends this information in a BGP message to its peers, border routers 104 and 102, along with other metrics concerning the respective links between border router 100 and border routers 104 and 102. This message includes AS 100's AS number. Border router 104 receives this message, stores this information and sends its own message to border router 108 indicating that the block of network layer addresses 216.128.x.x can be reached through it. When border router 104 sends this message, it pre-pends its AS number to the AS 100's number, so that the message contains AS 100's number and AS 200's number. In the same manner, border routers 108 and 102 propagate the reachability information throughout the network to their peers.

It is instructive to note that many times a router receives information about multiple routes to a particular destination. BGP on each border router uses the AS path to construct a loop free map of ASs and determines an optimal path from the multiple paths based, at least in part, on the number of AS's that must be crossed to reach the destination, also determined from the AS path.

For instance, referring again to FIG. 1, AS 500 is likely to determine that a packet destined for an IP address in the block 136.12.x.x is optimally routed to router 102 as its next hop. This is because the route using router 102 will traverse less ASs to reach its destination than the route, which utilizes router 108.

As the optimal routes are based upon network topology, once the router announces itself to its peers, incoming traffic distribution among the multiple links from its peers cannot be controlled by BGP. For example, BGP cannot control the distribution of incoming traffic to AS 100 between link 110 and link 112. In addition, BGP is limited in its knowledge about congestion and network performance over these multiple links At times an AS, particularly an ISP, may want to be able to control the link utilized for incoming traffic to a destination address based upon parameters of the links such as congestion, load or capacity. For instance, an ISP may want to have incoming traffic for preferred customers, e.g. those who pay for the service, come over a link that has the least congestion and load so as to provide faster data communications for that customer. Or an ISP may simply wish to provide optimal load balancing of its links so that all customers receive the optimal transmission rates.

The current prior art solution to control the links that incoming traffic for a particular destination arrives through is to manually separate the internal network into blocks of IP addresses (CIDR blocks), and statically announce these subnets differently toward the peer routers. This, however, is an unsatisfactory solution as it requires human resources and is generally not very accurate. Furthermore, this method is unsatisfactory as traffic is unable to be dynamically reshaped based upon current capacity, congestion, loading or when the health of any part of the internetwork becomes unstable.

SUMMARY OF THE INVENTION

The present invention provides a method of dynamically controlling traffic distribution across links between one or more border routers of an autonomous system and peer border routers of other autonomous systems. One or more networks within the autonomous system are logically divided into groups comprising one or more blocks of network layer protocol addresses. An optimal incoming traffic link for each group is then dynamically determined based at least in part on any of: load of each link over a predetermined interval of time, congestion of each link over a predetermined interval of time, capacity of each link, usage price or incoming traffic usage of each group over a predetermined interval of time. Each of the groups is then announced in a manner that biases incoming traffic for the group towards the optimal incoming traffic link. One manner the incoming traffic is biased is by pre-pending less AS numbers to a Border Gateway Protocol update message for announcements of each group across said incoming link than for announcements across non-optimal incoming traffic links. An alternative manner to bias the incoming traffic is by an aggregative announcement of all the blocks across all the links, with specific announcements of each block across the optimal incoming traffic link.

In a further embodiment of the method, incoming traffic usage for each of the blocks of network layer protocol addresses is determined over a predetermined interval of time. The groups are dynamically reconfigured by moving one or more of the blocks of network layer protocol addresses from a group to a different group based at least in part upon the incoming traffic usage for the blocks of network layer protocol addresses individually or aggregated as a group.

In a further embodiment of the method, for a communication session between a destination host external to the autonomous system and a source host internal to said autonomous system, an outgoing traffic link for the session is determined based upon any of: load of each link over a predetermined interval of time, congestion of each link over a predetermined interval of time, capacity of each link, usage price of each link, or proximity of the destination host to the source host for each of the links. An indicator is provided in a field of outgoing packets of the session to indicate to the one or more border routers to route outgoing packets for the session through the outgoing link. Alternatively, the one or more border routers are configured to route outgoing packets of the session from said source host through said outgoing link.

In another embodiment of the present invention, a method of controlling traffic distribution across multiple links in a first autonomous system is provided. The first autonomous system has multiple links to other autonomous systems via one or more border routers of the first autonomous system, which implement Border Gateway Protocol. One or more networks of the first autonomous system are divided into two or more blocks of IP addresses. Incoming traffic usage for each of these blocks of IP addresses is then determined over a predetermined interval of time. An optimal incoming traffic link for each of these blocks of IP addresses is dynamically determined based upon any of: load of each of the multiple links over a predetermined interval, congestion of each of the multiple links over a predetermined interval, capacity of each of the multiple links, usage price for each of the multiple links, or incoming traffic usage of the corresponding block of IP addresses over a predetermined interval. For each block of IP addresses, the block of IP addresses is announced in a manner biasing incoming traffic for the block towards the optimal incoming traffic link for the block. One method incoming traffic is biased by announcing blocks of IP addresses across non-optimal incoming traffic links via a Border Gateway Protocol update message having two or more local AS numbers pre-pended thereto. An alternative manner to bias the incoming traffic is by an aggregative announcement of all the blocks across all the links, with specific announcements of each block across the optimal incoming traffic link.

In a further embodiment of the method, the incoming traffic usage for each incoming link is determined by monitoring incoming traffic of each link over a predetermined period of time. Alternatively, this information is collected from the one or more local routers or remote peering routers.

In a further embodiment of the method, the blocks of IP addresses are dynamically re-divided by moving one or more of the blocks from one external link to a different external link based, at least in part, upon the incoming traffic usage of any of the whole link or the IP block itself.

In another embodiment of the present invention, a system comprising a congestion control unit connected to the one or more border routers of a first autonomous system is provided for dynamically controlling traffic distribution across links between the one or more border routers and peer border routers of other autonomous systems. The congestion control unit logically divides one or more networks within the first autonomous system into two or more blocks of network layer protocol addresses. Incoming traffic usage of each of the blocks of network layer protocol addresses over a predetermined interval is then determined by the congestion control unit. Based upon any of: load of each of said links over a predetermined interval, congestion of each of said links over a predetermined interval, capacity of each of said links, usage price of said links or incoming traffic usage of the corresponding block of network layer protocol addresses over a predetermined interval, the congestion control unit dynamically determines an incoming traffic link for each of the blocks of network layer protocol addresses. For each block of network layer protocol addresses, the congestion control unit causes each block of network layer protocol addresses to be announced in a manner that biases incoming traffic to towards the optimal incoming traffic link of the block. One such manner is announcing blocks of network layer protocol addresses across non-optimal incoming traffic links via a Border Gateway Protocol update message having two or more local AS numbers pre-pended thereto. A second such manner is by announcing aggregated blocks on all links, while announcing more specific blocks across single links.

In a further embodiment of the system, the incoming traffic usage for each link is determined by monitoring incoming traffic for each of the links over a predetermined period of time. Alternatively, this information can be collected from the one or more local routers or remote peering routers.

In a further embodiment of the system, the blocks of network layer protocol addresses are dynamically re-divided by moving one or more blocks from one link to a different link based, at least in part, upon the incoming traffic usage of any of the whole link or the address block specifically.

In a further embodiment of the system, the congestion control unit determines an outgoing traffic link for a communication session between a destination host external to the first autonomous system and a source host internal to the first autonomous system based upon any of. load of each link over a predetermined interval of time, congestion of each link over a predetermined interval of time, capacity of each link, usage price of the link or proximity of said destination host to said source host for each of said links. The congestion control unit then provides an indicator in a field of outgoing packets of the session to indicate to the one or more border routers to route the outgoing packets through the outgoing link. Alternatively, the congestion control unit configures the one or more border routers to route outgoing packets of the session from the source host through the outgoing link.

In another embodiment of the present invention, an article of manufacture is provided comprising storage media having software code embodied therein for dynamically controlling traffic distribution across links between one or more border routers of a first autonomous system and peer border routers of other autonomous systems. The software code comprises a first plurality of binary values for logically dividing a network within the first autonomous system into two or more blocks of network layer protocol addresses; a second plurality of binary values for dynamically determining an incoming traffic link for each of the blocks of network layer protocol addresses based upon any of: load of each of the links over a predetermined interval, congestion of each of the links over a predetermined interval capacity of each of the links, usage price of the link or incoming traffic usage of the corresponding block of network layer protocol addresses over a predetermined interval; and a third plurality of binary values for causing each block of network layer protocol addresses to be announced in a manner that biases incoming traffic towards the optimal incoming traffic link of the block. One such manner is announcing blocks of network layer protocol addresses across non-optimal incoming traffic links via a Border Gateway Protocol update message having two or more local AS numbers pre-pended thereto. A second such manner is by announcing aggregated blocks on all links, while announcing more specific blocks across single links.

In a further embodiment of the article of manufacture, the software code further comprises a plurality of binary values for monitoring incoming traffic usage for each of the links over a predetermined period of time. Alternatively, it further comprises a plurality of binary values for collecting this information periodically from the one or more local routers or remote peering routers.

In a further embodiment of the article of manufacture, the software code further comprises a plurality of binary values for dynamically re-dividing the blocks of network layer protocol addresses and moving one or more blocks from one link to a different link based at least in part upon the incoming traffic usage of any of the whole link or the specific block.

In a further embodiment of the article of manufacture, the software code further comprises a plurality of binary values for determining, for a communication session between a destination host external to said first autonomous system and a source host internal to said autonomous system, an outgoing traffic link for the session based upon any of load of each link over a predetermined interval of time, congestion of each link over a predetermined interval of time, capacity of each link, usage price of the link or proximity of said destination host to said source host for each of said links. To route outgoing packets of the session through the outgoing link, the software code further comprises a plurality of binary values for providing an indicator in a field in outgoing packets of the session to indicate to the one or more border routers to route the packets through the outgoing link. Alternatively, the software code further comprises a plurality of binary values for configuring the one or more border routers to route outgoing packets of the session from the source host through the outgoing link.

BRIEF DESCRIPTION OF THE DRAWINGS

FIG. 3 illustrates a group incoming traffic usage table.

FIG. 4 illustrates a link table.

FIG. 5 illustrates a proximity table

FIG. 6 illustrates a TOS policy table.

FIG. 7 illustrates a source policy routing table.

DESCRIPTION OF THE PREFERRED EMBODIMENTS

Figure 1:
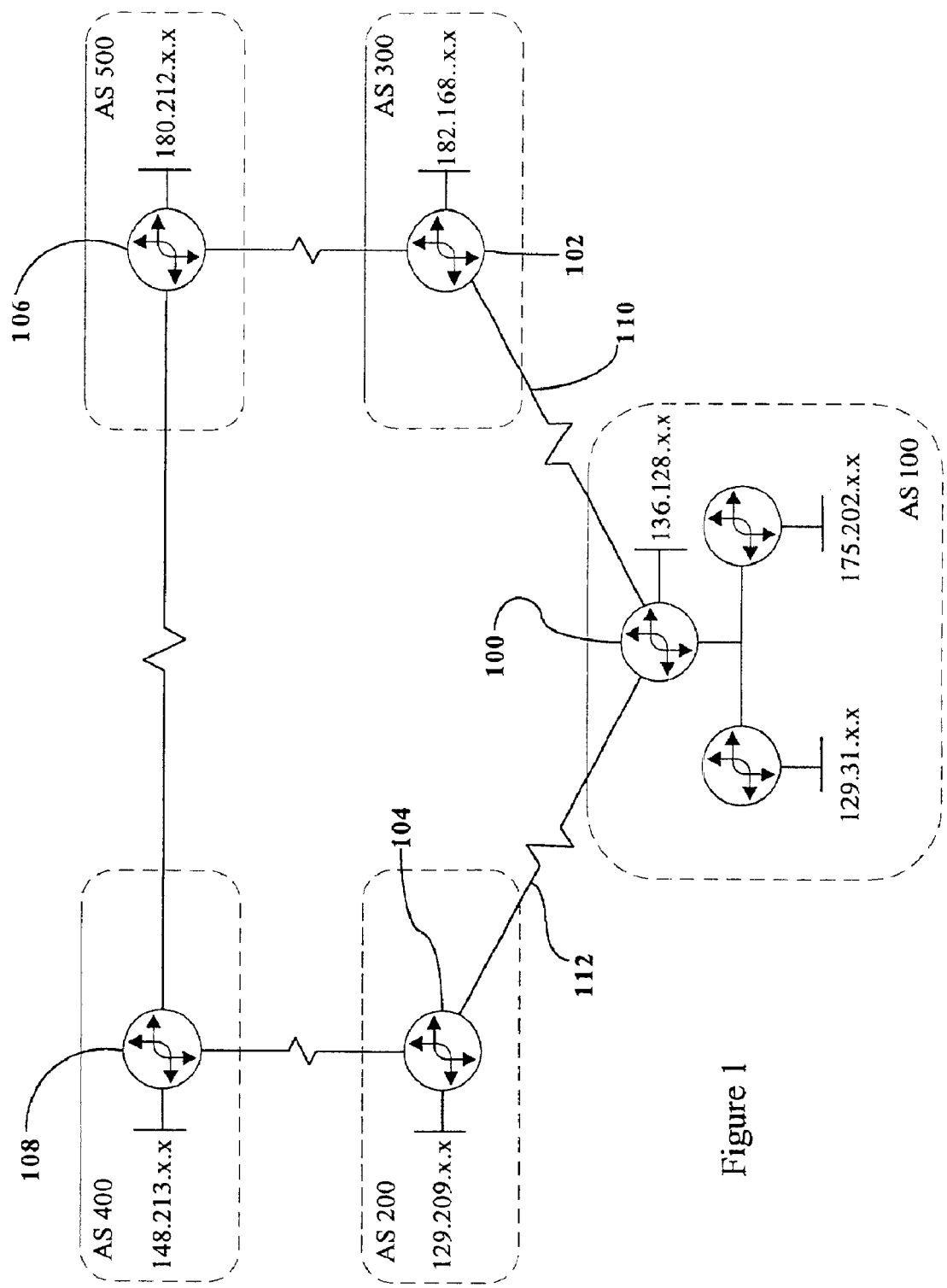
FIG. 1 illustrates routing connections and updates between autonomous systems.

While this invention is illustrated and described in a preferred embodiment, the present invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2:
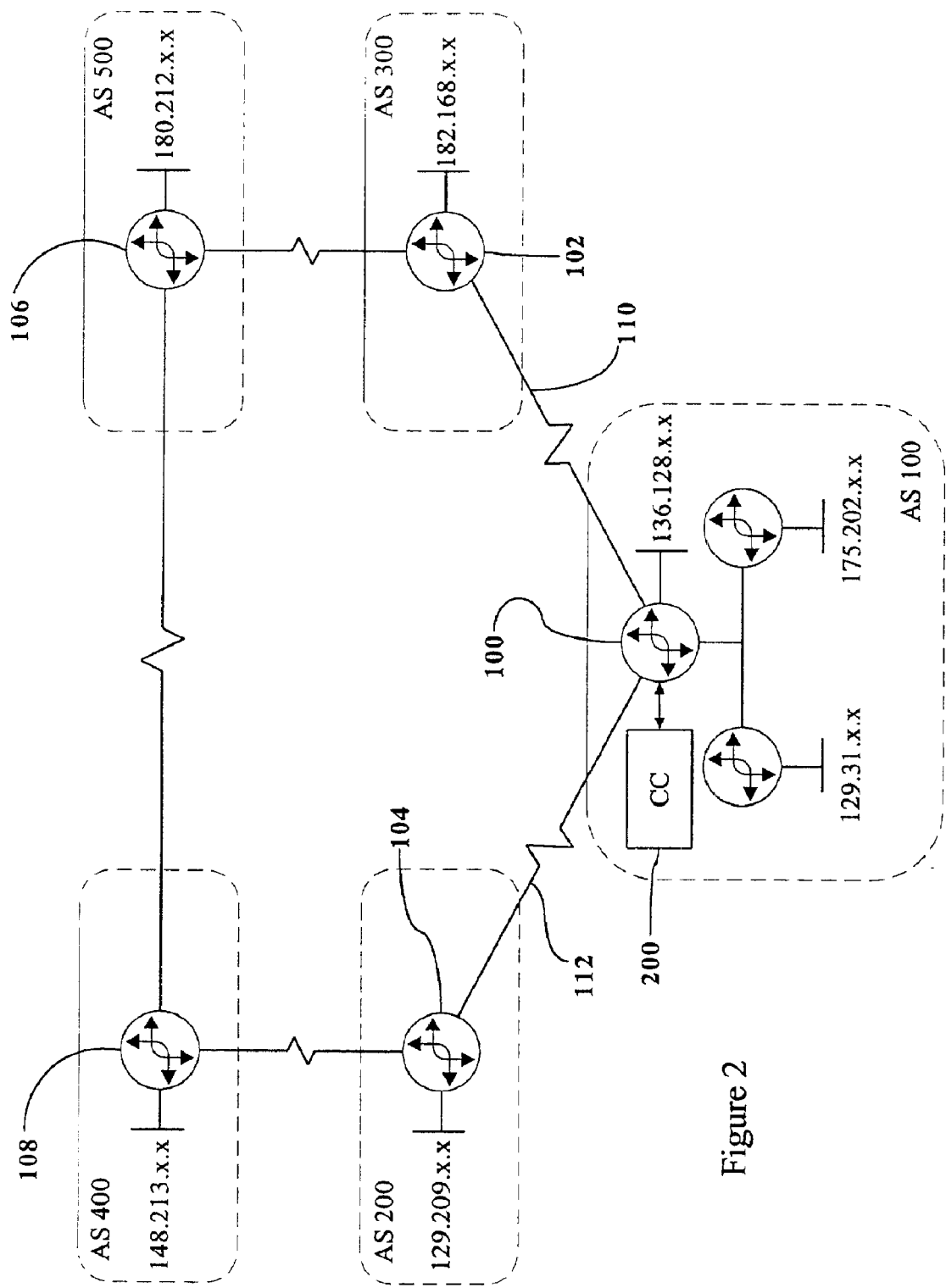
FIG. 2 illustrates routing connections and updates utilizing the present invention.

FIG. 2 illustrates an internetwork similar to FIG. 1 in which a congestion control unit 200 is utilized in accordance with the present invention to dynamically control traffic distribution on incoming links to an AS. Congestion control unit 200 comprises hardware and software for communicating with router 100 and for processing congestion control software. In general, congestion control software comprises data and instructions which, when read, interpreted, and executed by the hardware of congestion control unit 200, causes congestion control unit 200 to perform the steps of the present invention. Generally, the data and instructions are embodied in and readable from storage media, such as magnetic tape, optical disc, compact disc, hard disk, floppy disk, ferroelectric memory, EEPROM, flash memory, EPROM, ROM, DRAM, SRAM, SDRAM, ferromagnetic memory, optical storage, charge coupled devices, smart cards or any other appropriate static or dynamic memory, data storage devices, or remote devices coupled to congestion control unit 200. While the steps of the present invention are described as being performed by hardware instructed via software, those skilled in the art will recognize that the present invention may be implemented as a method, apparatus, or article of manufacture using standard programming and engineering techniques to produce software, hardware, firmware, or any combination thereof The term "article of manufacture" as used herein is intended to encompass logic and data embodied in or accessible from any device, carrier, or storage media.

Hereinafter, congestion control unit 200 and congestion control software is collectively described as Congestion-Control 200.

It should also be noted that, while CongestionControl 200 is illustrated in a sense in which data destined for a different AS would not pass directly through it (out-of-line), those skilled in the art will appreciate that congestion control unit 200 may be implemented inline, or indeed may even be integral to router 100.

According to a preferred embodiment of the present invention, CongestionControl 200 performs load balancing by logically separating the internal network, 136.128.x.x, into smaller blocks of IP addresses and, as will be described below, dynamically controlling which link is utilized for incoming traffic to each block. The multiple blocks that use the same link are considered as a group of blocks. By dynamically regrouping the blocks of IP addresses to different groups, associated to different incoming links, CongestionControl 200 can reach an optimal load balance across the links for incoming traffic. It is, however, advantageous to also allow human operators of CongestionControl 200 to set policies concerning the groups and link utilization, such as defining blocks of IP addresses which should not be divided, setting blocks of IP addresses which always receive incoming traffic via the best quality link in terms of, e.g. capacity, load, price and congestion, or setting blocks of IP addresses which always utilize a specific link.

When CongestionControl 200 divides the internal network into groups, it maintains a table of each block's and each group's incoming traffic usage over a predetermined period of time. Preferably, the period of time is the mandatory interval set by BGP between which it is illegal to announce reachability updates, however, it is advantageous to also allow the period of time to be configurable. The incoming traffic usage for each block or each group can be determined in a number of ways, and will generally be a design choice based upon hardware configurations. For example, when CongestionControl 200 is operated in an in-line sense, the incoming packets flow through CongestionControl 200 and it directly collects this information by aggregating the packet and byte count per block or group. Or, when CongestionControl 200 is operated in an out-of-line sense and border router 100 supports the counting of traffic by blocks or groups, then CongestionControl 200 communicates with border router 100 utilizing an appropriate protocol such as SNMP or telnet to retrieve this information. As another alternative, when border router 200 does not support such advanced statistics, CongestionControl 200 communicates with border router 100 to obtain port utilization indications, again, via an appropriate protocol such as SNMP, telnet or Service Assurance Agent (SAA) for Cisco™ routers. Even in an instance when port utilization indications is only able to provide information by groups, by moving blocks from busy groups to idle groups will accurately balance the load over longer periods of time. As another alternative the traffic can be copied by border router 100 to CongestionControl 200, allowing CongestionControl 200 to see all the traffic and calculate the utilization of traffic of each block and link, without having to be in the critical traffic path. An exemplary incoming traffic usage table is illustrated in FIG. 3.

In addition to incoming traffic usage table, CongestionControl 200 maintains a link table containing information on link parameters such as capacity, load, price and congestion over the predetermined period of time. Capacity of a link is partly known a priori, and is set by a human operator during CongestionControl 200 configuration. CongestionControl 200 also dynamically verifies the operational status of the links and their current capacity by querying the routers, listening to the routing messages or sending packets through the links. Querying the routers is done by any appropriate protocol, such as telnet, SNMP, rshell, etc. Listening to router messages is done using BGP, OSPF or RIP messages, or by any other protocol that discusses route failures between the routers. Load and congestion are determined utilizing active or passive means. By way of example, congestion of a link is related to the packet loss of packets passing through that link. Therefore, by actively sending packets to external routers or hosts and noting the responses, if any, from the external routers or hosts, packet loss can be determined to provide an indication of the congestion on a link. Alternatively, counting the retransmission rates on the links shows their congestion. Alternatively, border router 100 is queried to obtain its utilization statistics. These utilization statistics provide an indication of the packet loss, or other congestion metrics, in addition to link utilization (load) information. The price of each link is known a priori and is set by a human operator. The price may be changing in different hours of the day and having different price lines according to the utilization of the link. FIG. 4 illustrates an exemplary link table.

CongestionControl 200 utilizes these tables, and any policies concerning the groups and link utilization, as inputs to a load balancing algorithm, which determines the optimal allocation of incoming traffic to each group between the links and the appropriate configuration of groups from the blocks of IP addresses. The load balancing algorithm regroups the blocks of IP addresses and associates each group with an appropriate link as the optimal incoming traffic link to provide the optimal load balance.

Once the groups have been configured and associated with a link, CongestionControl 200 causes border router 100 to announce reachability information of the blocks of IP addresses in each group to its peers in a manner that biases incoming traffic for a group to the link associated with that group. To cause border router 100 to announce the groups in this manner, CongestionControl 200 communicates with border router 200 to configure the BGP settings of router 100. Configuration is performed using Telnet, Rshell, SNMP, IBGP, RS-232, configuration file uploading or any other appropriate method.

CongestionControl 200 configures border router 100 to announce each group in a manner to bias incoming traffic by adjusting the number of local AS numbers that are pre-pended to the announcement message sent over a specific link. It is preferable to announce each group over all of the links in order to maintain high availability, but, by controlling the number of pre-pended local AS numbers, the links not associated with a group are made to appear as if they are of a greater routing distance to the external routers. Therefore, the external routers prefer the associated link of a group for the traffic that is destined for that group.

To illustrate, referring to FIG. 3, the block of IP addresses designated as group 1 are associated with link 112 to provide optimal load balancing. CongestionControl 200 configures border router 100 to announce group 1 in a normal manner (1 AS number pre-pended) to router 104, while announcing group 1 to router 102 with five ((arbitrary number—actually, playing with this number can help with fine tuning the load balancing)) local AS numbers pre-pended to the message. In this manner, all of the outside routers view the path to border router 100 through link 112 as the shortest and will choose this as the optimal route. This is particularly illustrated with respect to AS 500. Normally, AS 500 would view the route to AS 100 through link 110 as having one transit AS (AS 300) in between, while viewing the route to AS 100 through link 112 as having two transit ASs (AS 400 and AS 200) in between. Therefore, AS 500 would normally use the route through link 110. However, by adding the additional local AS numbers to the update message, AS 500 now views the route to AS 100 through link 110 as having five transit ASs in between (4 extra pre-pended AS numbers+1 AS number from AS 300), while viewing the route to AS 100 through link 112 as only having the two transit ASs in between. Therefore, AS 500 will now find the route through link 112 as the optimal route when forwarding packets to AS 100.

As an alternative manner of biasing incoming traffic in order to control the incoming link usage for each block of IP addresses, CongestionControl 200 configures border router 100 to announce aggregated and specific routing to its peer routers. To illustrate it according to FIG. 3, the whole block of 136.128.x.x is announced across all the links, while more specific routes for the blocks of 136.128.0.0–136.128.15.255; 136.128.96.0–136.128.223.255 are announced through link 110 and the blocks of 136.128.16.0–136.128.95.255; 136.128.224.0–136.128.255.255 are announced on link 112.

As an alternative to CongestionControl 200 configuring border router 100 to announce reachability information to its peer routers in a manner biasing the incoming traffic, CongestionControl 200 contacts the peer routers and announces the reachability information to the peer routers directly.

It should also be noted that including policies concerning the groups and link utilization gives greater control over which links certain groups are associated with. This is particularly advantageous, as it allows the human operator to provide different levels of service to different groups. This is useful when particular applications of the hosts in a group need better quality links to insure minimum data transfer speeds, e.g. real time applications. Or, as in the case where AS 100 is an ISP, customers may pay for better quality of service grades, which provide higher data transfer speeds than lower quality of service grades. By way of example, when AS 100 is an ISP, a company pays AS 100 for the use of the block of IP addresses 129.31.x.x with a high quality of service. An administrator of AS 100 then configures CongestionControl 200 to not divide this block of IP addresses and to always associate traffic from this block with the best quality link in terms of, e.g. capacity, load, price and congestion. Therefore, when, for example, link 112 is determined to be the best quality link, block 129.31.x.x is associated with link 112, and router 100 is configured so that all announcements bias incoming traffic towards link 112. However, each of the IP addresses in the block of 175.202.x.x are paid for on an individual basis, such as by individual homeowners. Therefore, policies are set to divide and unite the IP addresses in 175.202.x.x with other groups and to associate these IP addresses in any manner providing an optimal load balance.

The "best quality" link would be the one which, overall, had the highest capacity coupled with the lowest congestion, price and load. Each one of these factors may have a disproportionate affect upon the quality of a given link, so at times these factors are weighted by an amount representative to their overall contribution to the quality of a link when determining the best link.

In a preferred embodiment of the present invention, in addition to controlling the distribution of incoming traffic, CongestionControl 200 also controls the distribution of outgoing traffic. When also utilized to control outgoing traffic distribution, it is possible that CongestionControl 200 operates in an in-line sense. It is also possible that the link associations for outgoing traffic is determined separately from those for incoming traffic.

To determine an outgoing link for outgoing traffic for a session between a source host on network 136.128.x.x originating from an AS and a destination host on a network originating from another AS, CongestionControl 200 keeps, a proximity table preferably containing information on physical proximity (in terms of route latency or number of hops) of the destination network or host for each link, in addition to parameters such as capacity, load, price and congestion. As with load and congestion, proximity information is determined utilizing active or passive means. Any means of determining the proximity of a destination host or network is appropriate, however, by way of example, CongestionControl 200 actively determines latency and number of hops to AS 500 by sending polling requests on each link (link 112 and link 110) to the destination host on the network originating from AS 500 and determining the latency and hops for each link from the replies to the polling requests. These requests may be performed by any of: sending a ping request to the destination host's network address, sending a TCP SYN or ACK message to the destination host's network address and port 80, sending a TCP SYN or ACK message to the destination host's network address and port or sending a UDP request to the destination host's network address to a sufficiently high port number as to elicit an "ICMP port unreachable" reply. The replies to any of these return latency information and Time To Live (TTL) information of the packet. From the TTL information, the number of hops is determined. Similar to polling the destination host the system can choose and poll any other host on the similar subnet of the destination, like the local DNS server, and get the proximity information from it. There are also providers of connectivity information for the Internet who maintain databases on routes between two ASs. Therefore, alternatively, CongestionControl 200 can query one of the databases and determine the latency and hops for each link. Queries to external databases can be done dynamically when the information is needed, or the external database can be imported and incorporated internally in CongestionControl 200.

CongestionControl 200 utilizes this table, and any administrative policies in effect as inputs to a load balancing algorithm, which, preferably in a manner similar to that described in co-pending U.S. patent application Ser. No. 09/467,763, incorporated herein by reference, determines the link for packets of the session which either provides for optimal load balancing, or the best quality link for the session. Generally, the closer in proximity the destination is, the better quality a link is considered. The proximity may have more or less weight in determining the link for the session depending upon whether optimal load balancing is desired, or the overall best quality link is desired. Once the link is determined, CongestionControl 200 causes all packets for that session to be sent via the ink.

One preferred method of causing packets for a session to be sent via a specific link is done by tagging fields within a packet and maintaining a policy routing table at border router 100, which associates a tag with a link. For example, the packets are marked for a specific link using a specific IPv4 Type Of Service (TOS) octet. Another option is for the packets to be marked for a specific link using a specific Ethernet 802.1q tag. This is useful when multiple links are connected to a single router while this router needs to be prompted dynamically for which link it should use for an outgoing packet. FIG. 6 illustrates an exemplary policy table associating TOS tags with links.

As an alternative manner for controlling the distribution of outgoing traffic, the load balancing algorithm determines the outgoing link that either provides for optimal load balancing or the best quality link for packets originating from a particular source subnet or, alternatively, destined for a particular destination subnet. CongestionControl 200 configures router 100 to set static routing policies for destination subnets or, alternatively, source subnets. These static routing policies are maintained in a table at border router 100. In this manner, packets originating from a particular source subnet, or alternatively, destined for a particular destination subnet, are routed to the outgoing link providing optimal load balance or best quality. FIG. 7 illustrates an exemplary static routing table for packets originating from particular source subnets.

While the present invention has been described with respect to a single border router for an AS, one of skill in the art would appreciate that the present invention may be utilized when AS has multiple border routers and each border router is connected to one or more links. As another alternative method for controlling the distribution of outgoing traffic when multiple routers are used, CongestionControl 200 balances the outgoing traffic across the multiple routers. One possible configuration for this case is to have multiple CongestionControl units stationed next to each border router of the autonomous system. Each CongestionControl unit controls the traffic going towards the respective router, but also insures an optimal flow out of the whole network.

To provide optimal flow out of the whole network, there may be a need for border routers to pass packets between each other in order to send them out the link providing optimal load balance or which is the best quality link. For instance, a packet may arrive at one router because it is the router an internal source is working with. A different router, however, has the link that the packet needs to be sent out in order to provide optimal load, or because the link is the best quality link. Therefore, the packet needs to be forwarded from the router the packet arrived at to the one having the link the packet needs to go out. One manner of providing this forwarding is accomplished in the same manner as when there is only a single router, i.e. by tagging the packet. The other border routers are just like another link to the border router that receives traffic from a CongestionControl unit. Tagging the packets to one router causes them to be forwarded and sent out from another link of another border router. Another manner of providing this forwarding is for CongestionControl 200 to configure a local preference value on the multiple border routers for destination subnets to control their outgoing transmission policy.

It will be appreciated in the foregoing embodiments that capacity, load, congestion, price or proximity may be used together or in any combination thereof for determining the link for incoming or outgoing traffic. For example, when it is possible to obtain statistics of incoming traffic from external sources to groups in an AS, it is possible to use this information to determine the optimal incoming traffic links to take advantage of the likely proximity of an external source. The actual parameters utilized are a matter of design choice and may be different depending upon the specifics of the networks.

CONCLUSION

A system and method has been shown in the above embodiments for effectively controlling traffic on links between autonomous systems. While various preferred embodiments have been shown and described, it will be understood that there is no intent to limit the invention by such disclosure, but rather, it is intended to cover all modifications and alternate constructions falling within the spirit and scope of the invention, as defined in the appended claims.

What is claimed is:

1. A method of dynamically controlling traffic distribution across links between one or more border routers of a first autonomous system and peer border routers of different autonomous systems, said method comprising:

logically dividing one or more networks within said first autonomous system into groups comprising one or more blocks of network layer protocol addresses;

dynamically determining an optimal incoming traffic link for each group based at least in part on any of: load of each link over a predetermined interval of time, congestion of each link over a predetermined interval of time, usage price of the link, capacity of each link or incoming traffic usage of each group over a predetermined interval of time, and announcing reachability information for each group to said peer border routers in a manner biasing incoming traffic for each group towards said optimal incoming traffic link for each group.

2. A method of dynamically controlling traffic distribution across links between one or more border routers of a first autonomous system and peer border routers of different autonomous systems, as per claim 1, said method further comprising:

determining incoming traffic usage for any of: said one or more blocks of network layer protocol addresses for each of said groups over a predetermined interval of time or for each of said groups as a whole over a predetermined interval, and dynamically reconfiguring said groups by moving one or more of said blocks from a group to a different group based at least in part upon incoming traffic usage for any of: said one or more blocks of network layer protocol addresses for each of said groups over a predetermined interval of time or for each of said groups as a whole.

3. A method of dynamically controlling traffic distribution across links between one or more border routers of a first autonomous system and peer border routers of different autonomous systems, as per claim 1, wherein said one or more border routers announce reachability information utilizing Border Gateway Protocol.

4. A method of dynamically controlling traffic distribution across links between one or more border routers of a first autonomous system and peer border routers of different autonomous systems, as per claim 3, wherein incoming traffic is biased by pre-pending less AS numbers to a Border Gateway Protocol update message for announcements of each block of IP addresses across said optimal incoming link than for announcements of that block across non-optimal incoming traffic links.

5. A method of dynamically controlling traffic distribution across links between one or more border routers of a first autonomous system and peer border routers of different autonomous systems, as per claim 1, wherein incoming traffic is biased by announcing aggregate network layer protocol addresses of said one or more networks across all links and, for each block of IP addresses, specifically announcing said block across said optimal incoming traffic link for said block.

6. A method of dynamically controlling traffic distribution across links between one or more border routers of a first autonomous system and peer border routers of different autonomous systems, as per claim 1, wherein congestion of any of said links is determined by actively sending packets to routers or hosts external to said first autonomous system via the link and monitoring responses to said packets to determine packet loss.

7. A method of dynamically controlling traffic distribution across links between one or more border routers of a first autonomous system and peer border routers of different autonomous systems, as per claim 1, wherein congestion or load of any of said links is determined by querying said one or more border routers to determine utilization statistics.

8. A method of dynamically controlling traffic distribution across links between one or more border routers of a first autonomous system and peer border routers of different autonomous systems, as per claim 1, wherein congestion or load of any of said links is determined by detecting retransmission rates over sessions passing through each link.

9. A method of dynamically controlling traffic distribution across links between one or more border routers of a first autonomous system and peer border routers of different autonomous systems, as per claim 1, wherein said optimal incoming traffic link for at least one of said groups is always the best quality link in terms of any from the group consisting of: congestion, load, capacity, usage price of the link and proximity.

10. A method of dynamically controlling traffic distribution across links between one or more border routers of a first autonomous system and peer border routers of different autonomous systems, as per claim 1, wherein said optimal incoming traffic link is determined to provide an incoming traffic distribution with optimal load balancing across said links between one or more border routers of a first autonomous system and peer border routers of different autonomous systems.

11. A method of dynamically controlling traffic distribution across links between one or more border routers of a first autonomous system and peer border routers of different autonomous systems, as per claim 1, wherein said optimal incoming traffic link is determined to provide an incoming traffic distribution optimal response time.

12. A method of dynamically controlling traffic distribution across links between one or more border routers of a first autonomous system and peer border routers of different autonomous systems, as per claim 11, wherein said field is an IP TOS header field.

13. A method of dynamically controlling traffic distribution across links between one or more border routers of a first autonomous system and peer border routers of different autonomous systems, as per claim 11, wherein said field is an Ethernet 802.1q field.

14. A method of dynamically controlling traffic distribution across links between one or more border routers of a first autonomous system and peer border routers of different autonomous systems, as per claim 1, wherein said optimal incoming traffic link is determined to provide an incoming traffic distribution with optimal usage cost.

15. A method of dynamically controlling traffic distribution across links between one or more border routers of a first autonomous system and peer border routers of different autonomous systems, as per claim 1, wherein said optimal incoming traffic link is determined to provide an incoming traffic distribution with a weighted combination of optimal load balancing across said links between one or more border routers of a first autonomous system and peer border routers of different autonomous systems, optimal response time and optimal usage cost.

16. A method of dynamically controlling traffic distribution across links between one or more border routers of a first autonomous system and peer border routers of different autonomous systems, as per claim 1, wherein said first autonomous system is an Internet Service Provider.

17. A method of dynamically controlling traffic distribution across links between one or more border routers of a first autonomous system and peer border routers of different autonomous systems, as per claim 1, said method further comprising:
  for a communication session between a destination host external to said first autonomous system and a source host internal to said first autonomous system, dynamically determining an outgoing traffic link for said session based upon any of: load of each link over a predetermined interval of time, congestion of each link over a predetermined interval of time, capacity of each link, usage price of the link or proximity of said destination host to said source host for each of said links, and
  providing an indicator in a field of outgoing packets of said session to indicate to said one or more border routers to route said packets through said outgoing link.

18. A method of dynamically controlling traffic distribution across links between one or more border routers of a first autonomous system and peer border routers of different autonomous systems, as per claim 17, wherein said proximity of said destination host to said source host for each of said links is determined by any of: polling a host on a similar subnet of said destination host or querying a database containing information on routes between autonomous systems.

19. A method of dynamically controlling traffic distribution across links between one or more border routers of a first autonomous system and peer border routers of different autonomous systems, as per claim 1, said method further comprising:
  for a communication session between a destination host external to said first autonomous system and a source host internal to said autonomous system, dynamically determining an outgoing traffic link for said session based upon any of: load of each link over a predetermined interval of time, congestion of each link over a predetermined interval of time, capacity of each link, usage price of the link or proximity of said destination host to said source host for each of said links, and configuring said one or more border routers to route outgoing packets of said session from said source host through said outgoing link.

20. A method of dynamically controlling traffic distribution across links between one or more border routers of a first autonomous system and peer border routers of different autonomous systems, as per claim 19, wherein said proximity of said destination host to said source host for each of said links is determined by any of: polling a host on a similar subnet of said destination host or querying a database containing information on routes between autonomous systems.

21. A method of dynamically controlling traffic distribution across links between one or more border routers of a first autonomous system and peer border routers of different autonomous systems, as per claim 1, wherein said one or more border routers are configured to announce reachability information for each group to said peer border routers in a manner biasing incoming traffic for each group towards said optimal incoming traffic link for each group by a congestion control unit connected to said one or more border routers.

22. A method of dynamically controlling traffic distribution across links between one or more border routers of a first autonomous system and peer border routers of different autonomous systems, as per claim 1, wherein a congestion control unit connected to said one or more border routers announces reachability information for each group to said peer border routers in a manner biasing incoming traffic for each group towards said optimal incoming traffic link for each group.

23. In a first autonomous system having multiple links to different autonomous systems via one or more border routers of said first autonomous system wherein said one or more border routers implement Border Gateway Protocol, a method of controlling traffic distribution across said multiple links comprising:
  logically dividing one or more networks within said first autonomous system into two or more blocks of IP addresses;
  determining incoming traffic usage of any of: each of said blocks of IP addresses over a predetermined interval or for a group of said blocks as a whole over a predetermined interval;
  dynamically determining an optimal incoming traffic link for each of said blocks of IP addresses based upon any of: load of each of said multiple links over a predetermined interval, congestion of each of said multiple links over a predetermined interval, capacity of each of said multiple links, usage price of the link or incoming traffic usage of the corresponding block of IP addresses over a predetermined interval, and
  for each block of IP addresses, announcing said block of IP addresses in a manner causing incoming traffic to be biased towards said optimal incoming traffic link.

24. In a first autonomous system having multiple links to different autonomous systems via one or more border routers of said first autonomous system wherein said one or more border routers implement Border Gateway Protocol, a method of controlling traffic distribution across said multiple links, as per claim 23, wherein said incoming traffic is biased by announcing said blocks of IP addresses across non-optimal incoming traffic links via a Border Gateway Protocol update message having two or more local AS numbers pre-pended thereto.

25. In a first autonomous system having multiple links to different autonomous systems via one or more border routers of said first autonomous system wherein said one or more border routers implement Border Gateway Protocol, a method of controlling traffic distribution across said multiple links, as per claim 23, wherein said incoming traffic is biased by announcing aggregate IP addresses of said one or more networks across all links and specifically announcing each of said blocks of IP addresses across said optimal incoming traffic link of each block.

26. A system for dynamically controlling traffic distribution across links between one or more border routers of a first autonomous system and peer border routers of different autonomous systems, said system comprising:
  at least one congestion control unit connected to said one or more border routers;
  said congestion control unit logically dividing one or more networks within said first autonomous system into two or more blocks of network layer protocol addresses;
  said congestion control unit determining incoming traffic usage of any of: each of said blocks of IP addresses over a predetermined interval or for a group of said blocks as a whole over a predetermined interval;
  said congestion control unit dynamically determining an optimal incoming traffic link for each of said blocks of network layer protocol based upon any of: load of each of said links over a predetermined interval, congestion of each of said links over a predetermined interval, capacity of each of said links, usage price of the link or incoming traffic usage of the corresponding block of network layer protocol addresses over a predetermined interval, and
  said congestion control unit, for each block of network layer protocol addresses, causing said block of network layer protocol addresses to be announced in a manner biasing incoming traffic towards said optimal incoming traffic link of said block of network layer protocol addresses.

27. A system for dynamically controlling traffic distribution across links between one or more border routers of a first autonomous system and peer border routers of different autonomous systems, as per claim 26, wherein said network layer protocol addresses are IP addresses.

28. A system for dynamically controlling traffic distribution across links between one or more border routers of a first autonomous system and peer border routers of different autonomous systems, as per claim 26, wherein said one or more border routers communicate with said peer border routers utilizing Border Gateway Protocol.

29. A system for dynamically controlling traffic distribution across links between one or more border routers of a first autonomous system and peer border routers of different autonomous systems, as per claim 28, wherein said incoming traffic is biased by announcing said blocks of network layer protocol addresses across non-optimal incoming traffic links via a Border Gateway Protocol update message having two or more local AS numbers pre-pended thereto.

30. A system for dynamically controlling traffic distribution across links between one or more border routers of a first autonomous system and peer border routers of different autonomous systems, as per claim 26, wherein said incoming traffic is biased by announcing aggregate IP addresses of said one or more networks across all links and specifically announcing each of said blocks of IP addresses across said optimal incoming traffic link of each block.

31. A system for dynamically controlling traffic distribution across links between one or more border routers of a first autonomous system and peer border routers of different autonomous systems, as per claim 26, wherein congestion of any of said link is determined by actively sending packets to routers or hosts external to said first autonomous system via the link and monitoring responses to said packets to determine packet loss.

32. A system for dynamically controlling traffic distribution across links between one or more border routers of a first autonomous system and peer border routers of different autonomous systems, as per claim 26, wherein congestion or load of any of said links is determined by querying said one or more border routers to determine utilization statistics.

33. A system for dynamically controlling traffic distribution across links between one or more border routers of a first autonomous system and peer border routers of different autonomous systems, as per claim 26, wherein congestion or load of any of said links is determined by detecting retransmission rates over sessions passing through each link.

34. A system for dynamically controlling traffic distribution across links between one or more border routers of a first autonomous system and peer border routers of different autonomous systems, as per claim 26, wherein said optimal incoming traffic link for at least one of said groups is always the best quality link in terms of any from the group consisting of: congestion, load, capacity, usage price of the link and proximity.

35. A system for dynamically controlling traffic distribution across links between one or more border routers of a first autonomous system and peer border routers of different autonomous systems, as per claim 26, wherein said optimal incoming traffic link is determined to provide an incoming traffic distribution with optimal load balancing across said links between one or more border routers of a first autonomous system and peer border routers of different autonomous systems.

36. A system for dynamically controlling traffic distribution across links between one or more border routers of a first autonomous system and peer border routers of different autonomous systems, as per claim 26, wherein said optimal incoming traffic link is determined to provide an incoming traffic distribution with optimal response time.

37. A system for dynamically controlling traffic distribution across links between one or more border routers of a first autonomous system and peer border routers of different autonomous systems, as per claim 26, wherein said optimal incoming traffic link is determined to provide an incoming traffic distribution with optimal usage cost.

38. A system for dynamically controlling traffic distribution across links between one or more border routers of a first autonomous system and peer border routers of different autonomous systems, as per claim 26, wherein said optimal incoming traffic link is determined to provide an incoming traffic distribution with a weighted combination of optimal load balancing across said links between one or more border routers of a first autonomous system and peer border routers of different autonomous systems, optimal response time and optimal usage cost.

39. A system for dynamically controlling traffic distribution across links between one or more border routers of a first autonomous system and peer border routers of different autonomous systems, as per claim 26, wherein said first autonomous system is an Internet Service Provider.

40. A system for dynamically controlling traffic distribution across links between one or more border routers of a first autonomous system and peer border routers of different autonomous systems, as per claim 26, wherein:

for a communication session between a destination host external to said first autonomous system and a source host internal to said first autonomous system, said congestion control unit determining an outgoing traffic link for said session based upon any of: load of each link over a predetermined interval of time, congestion of each link over a predetermined interval of time, capacity of each link, usage price of the link or proximity of said destination host to said source host for each of said links, and said congestion control unit providing an indicator in a field in outgoing packets of said session to indicate to said one or more border routers to route said packets through said outgoing link.

41. A system for dynamically controlling traffic distribution across links between one or more border routers of a first autonomous system and peer border routers of different autonomous systems, as per claim 40, wherein said proximity of said destination host to said source host for each of said links is determined by any of: polling a host on a similar subnet of said destination host or querying a database containing information on routes between autonomous systems.

42. A system for dynamically controlling traffic distribution across links between one or more border routers of a first autonomous system and peer border routers of different autonomous systems, as per claim 40, wherein said field is an IP TOS header field.

43. A system for dynamically controlling traffic distribution across links between one or more border routers of a first autonomous system and peer border routers of different autonomous systems, as per claim 40, wherein said field is an Ethernet 802.1q field.

44. A system for dynamically controlling traffic distribution across links between one or more border routers of a first autonomous system and peer border routers of different autonomous systems, as per claim 26, wherein:

for a communication session between a destination host external to said first autonomous system and a source host internal to said autonomous system, said congestion control unit dynamically determining an outgoing traffic link for said session based upon any of: load of each link over a predetermined interval of time, congestion of each link over a predetermined interval of time, capacity of each link, usage price of the link or proximity of said destination host to said source host for each of said links, and said congestion control unit configuring said one or more border routers to route outgoing packets of said session from said source host through said outgoing link.

45. A system for dynamically controlling traffic distribution across links between one or more border routers of a first autonomous system and peer border routers of different autonomous systems, as per claim 44, wherein said proximity of said destination host to said source host for each of said links is determined by any of: polling a host on a similar subnet of said destination host or querying a database containing information on routes between autonomous systems.

46. A system for dynamically controlling traffic distribution across links between one or more border routers of a first autonomous system and peer border routers of different autonomous systems, as per claim 26, wherein said congestion control unit configures said one or more border routers to announce reachability information for each group to said peer border routers in a manner biasing incoming traffic for each group towards said optimal incoming traffic link for each group by.

47. A system for dynamically controlling traffic distribution across links between one or more border routers of a first autonomous system and peer border routers of different autonomous systems, as per claim 26, wherein said congestion control unit announces reachability information for each group to said peer border routers in a manner biasing incoming traffic for each group towards said optimal incoming traffic link for each group.

48. A system for dynamically controlling traffic distribution across links between one or more border routers of a first autonomous system and peer border routers of different autonomous systems, as per claim 26, wherein said congestion control unit is connected to said one or more border routers in an in-line sense.

49. A system for dynamically controlling traffic distribution across links between one or more border routers of a first autonomous system and peer border routers of different autonomous systems, as per claim 48, wherein said congestion control unit determines incoming traffic usage of each of said blocks of IP addresses over a predetermined by aggregating a packet and byte count per IP block for each of said blocks of IP addresses over a predetermined interval.

50. A system for dynamically controlling traffic distribution across links between one or more border routers of a first autonomous system and peer border routers of different autonomous systems, as per claim 48, wherein said congestion control unit determines incoming traffic usage for a group of said blocks as a whole over a predetermined interval, by aggregating a packet and byte count per group over a predetermined interval.

51. A system for dynamically controlling traffic distribution across links between one or more border routers of a first autonomous system and peer border routers of different autonomous systems, as per claim 26, wherein said congestion control unit is connected to said one or more border routers in an out-of-line sense.

52. A system for dynamically controlling traffic distribution across links between one or more border routers of a first autonomous system and peer border routers of different autonomous systems, as per claim 51, wherein said congestion control unit queries said one or more border routers to retrieve statistics indicating incoming traffic usage.

53. A system for dynamically controlling traffic distribution across links between one or more border routers of a first autonomous system and peer border routers of different autonomous systems, as per claim 52, wherein said one or more border routers copies traffic to said congestion control unit for calculating incoming traffic usage.

54. A system for dynamically controlling traffic distribution across links between one or more border routers of a first autonomous system and peer border routers of different autonomous systems, as per claim 26, said at least one congestion control unit comprises a plurality of congestion control units, each of said congestion control units connected to a corresponding border router to control outgoing traffic of a portion of said autonomous system to provide overall control of outgoing traffic.

55. An article of manufacture comprising storage media having software code embodied therein for dynamically controlling traffic distribution across links between one or more border routers of a first autonomous system and peer border routers of different autonomous systems, said software code comprising:

a first plurality of binary values logically dividing a network within said first autonomous system into two or more blocks of network layer protocol addresses;

a second plurality of binary values dynamically determining an optimal incoming traffic link for each of said blocks of network layer protocol addresses based upon any of: load of each of said links over a predetermined interval, congestion of each of said links over a predetermined interval, capacity of each of said links, usage price of the link or incoming traffic usage of the corresponding block of network layer protocol addresses over a predetermined interval, and a third plurality of binary values causing, for each block of network layer protocol addresses, said block of network layer protocol addresses to be announced in a manner biasing incoming traffic towards said optimal incoming traffic link of said block of network layer protocol addresses.

56. An article of manufacture comprising storage media having software code embodied therein for dynamically controlling traffic distribution across links between one or more border routers of a first autonomous system and peer border routers of different autonomous systems, as per claim 55, wherein said network layer protocol addresses are IP addresses.

57. An article of manufacture comprising storage media having software code embodied therein for dynamically controlling traffic distribution across links between one or more border routers of a first autonomous system and peer border routers of different autonomous systems, as per claim 56, wherein said one or more border routers communicate with said peer border routers utilizing Border Gateway Protocol.

58. An article of manufacture comprising storage media having software code embodied therein for dynamically controlling traffic distribution across links between one or more border routers of a first autonomous system and peer border routers of different autonomous systems, as per claim 57, wherein said incoming traffic is biased by announcing said blocks of network layer protocol addresses across non-optimal incoming traffic links via a Border Gateway Protocol update message having two or more local AS numbers pre-pended thereto.

59. An article of manufacture comprising storage media having software code embodied therein for dynamically controlling traffic distribution across links between one or more border routers of a first autonomous system and peer border routers of different autonomous systems, as per claim 57, wherein said proximity of said destination host to said source host for each of said links is determined by any of: polling a host on a similar subnet of said destination host or querying a database containing information on routes between autonomous systems.

60. An article of manufacture comprising storage media having software code embodied therein for dynamically controlling traffic distribution across links between one or more border routers of a first autonomous system and peer border routers of different autonomous systems, as per claim 55, wherein said incoming traffic is biased by announcing aggregate network layer protocol addresses of said one or more networks across all links and announcing each of said blocks of network layer protocol addresses across said optimal incoming traffic link of each block.

61. An article of manufacture comprising storage media having software code embodied therein for dynamically controlling traffic distribution across links between one or more border routers of a first autonomous system and peer border routers of different autonomous systems, as per claim 55, said software code further comprising:

a fourth plurality of binary values determining congestion of any of said links by actively sending packets to routers or hosts external to said first autonomous system via the link and monitoring responses to said packets to determine packet loss.

62. An article of manufacture comprising storage media having software code embodied therein for dynamically controlling traffic distribution across links between one or more border routers of a first autonomous system and peer border routers of different autonomous systems, as per claim 55, said software code further comprising:
- a fourth plurality of binary values for determining congestion or load of any of said links by querying said one or more border routers to determine utilization statistics.

63. An article of manufacture comprising storage media having software code embodied therein for dynamically controlling traffic distribution across links between one or more border routers of a first autonomous system and peer border routers of different autonomous systems, as per claim 55, said software code further comprising:
- a fourth plurality of binary values for determining congestion or load of any of said links by detecting retransmission rates over sessions passing through each link.

64. An article of manufacture comprising storage media having software code embodied therein for dynamically controlling traffic distribution across links between one or more border routers of a first autonomous system and peer border routers of different autonomous systems, as per claim 55, wherein said optimal incoming traffic link for at least one of said groups is always the best quality link in terms of any from the group consisting of: congestion, load, capacity, usage price of the link and proximity.

65. An article of manufacture comprising storage media having software code embodied therein for dynamically controlling traffic distribution across links between one or more border routers of a first autonomous system and peer border routers of different autonomous systems, as per claim 55, wherein said optimal incoming traffic link is determined to provide an incoming traffic distribution with optimal load balancing across said links between one or more border routers of a first autonomous system and peer border routers of different autonomous systems.

66. An article of manufacture comprising storage media having software code embodied therein for dynamically controlling traffic distribution across links between one or more border routers of a first autonomous system and peer border routers of different autonomous systems, as per claim 55, wherein said optimal incoming traffic link is determined to provide an incoming traffic distribution with optimal response time.

67. An article of manufacture comprising storage media having software code embodied therein for dynamically controlling traffic distribution across links between one or more border routers of a first autonomous system and peer border routers of different autonomous systems, as per claim 55, wherein said optimal incoming traffic link is determined to provide an incoming traffic distribution with optimal usage cost.

68. An article of manufacture comprising storage media having software code embodied therein for dynamically controlling traffic distribution across links between one or more border routers of a first autonomous system and peer border routers of different autonomous systems, as per claim 55, wherein said optimal incoming traffic link is determined to provide an incoming traffic distribution with a weighted combination of optimal load balancing across said links between one or more border routers of a first autonomous system and peer border routers of different autonomous systems, optimal response time, and optimal usage cost.

69. An article of manufacture comprising storage media having software code embodied therein for dynamically controlling traffic distribution across links between one or more border routers of a first autonomous system and peer border routers of different autonomous systems, as per claim 55, wherein said first autonomous system is an Internet Service Provider.

70. An article of manufacture comprising storage media having software code embodied therein for dynamically controlling traffic distribution across links between one or more border routers of a first autonomous system and peer border routers of different autonomous systems, as per claim 55, said software code further comprising:
- a fourth plurality of binary values determining, for a communication session between a destination host external to said first autonomous system and a source host internal to said autonomous system, an outgoing traffic link for said session based upon any of: load of each link over a predetermined interval of time, congestion of each link over a predetermined interval of time, capacity of each link, usage price of the link or proximity of said destination host to said source host for each of said links, and
- a fifth plurality of binary values providing an indicator in a field in outgoing packets of said session to indicate to said one or more border routers to route said packets through said outgoing link.

71. An article of manufacture comprising storage media having software code embodied therein for dynamically controlling traffic distribution across links between one or more border routers of a first autonomous system and peer border routers of different autonomous systems, as per claim 70, wherein said field is an IP TOS header field.

72. An article of manufacture comprising storage media having software code embodied therein for dynamically controlling traffic distribution across links between one or more border routers of a first autonomous system and peer border routers of different autonomous systems, as per claim 70, wherein said field is an Ethernet 802.1q field.

73. An article of manufacture comprising storage media having software code embodied therein for dynamically controlling traffic distribution across links between one or more border routers of a first autonomous system and peer border routers of different autonomous systems, as per claim 55, said software code further comprising:
- a fourth plurality of binary values determining, for a communication session between a destination host external to said first autonomous system and a source host internal to said autonomous system, an outgoing traffic link for said session based upon any of: load of each link over a predetermined interval of time, congestion of each link over a predetermined interval of time, capacity of each link, usage price of the link or proximity of said destination host to said source host for each of said links, and
- a fifth plurality of binary values for configuring said one or more border routers to route outgoing packets of said session from said source host through said outgoing link.

74. An article of manufacture comprising storage media having software code embodied therein for dynamically controlling traffic distribution across links between one or more border routers of a first autonomous system and peer border routers of different autonomous systems, as per claim 73, wherein said proximity of said destination host to said source host for each of said links is determined by any of: polling a host on a similar subnet of said destination host or querying a database containing information on routes between autonomous systems.

* * * * *